United States Patent [19]

Maeda

[11] Patent Number: 4,835,641
[45] Date of Patent: May 30, 1989

[54] MAGNETIC DISK APPARATUS

[75] Inventor: Nobuaki Maeda, Hon, Japan

[73] Assignee: Mitsubishi Denki Kabushiki Kaisha, Japan

[21] Appl. No.: 50,405

[22] Filed: May 18, 1987

[30] Foreign Application Priority Data

May 19, 1986 [JP] Japan .................................. 61-116353

[51] Int. Cl.$^4$ ............................................... G11B 5/48
[52] U.S. Cl. ...................................... 360/104; 360/106
[58] Field of Search ................ 360/104, 98, 109, 106, 360/105, 97, 99

[56] References Cited

U.S. PATENT DOCUMENTS 4,349,851  9/1982  Higashiyama et al. ............. 360/104

FOREIGN PATENT DOCUMENTS

| | | | |
|---|---|---|---|
| 59-218666 | 12/1984 | Japan | 360/104 |
| 60-29986 | 2/1985 | Japan | 360/104 |
| 60-29988 | 2/1985 | Japan | 360/104 |
| 60-89880 | 5/1985 | Japan | 360/104 |
| 61-29474 | 2/1986 | Japan | 360/98 |

Primary Examiner—John H. Wolff
Assistant Examiner—Matthew J. Bussan
Attorney, Agent, or Firm—Leydig, Voit & Mayer

[57] ABSTRACT

A magnetic disk apparatus including a disc drive assembly for driving a magnetic disc and a head supporting assembly for supporting a plurality of magnetic heads at predetermined relationships with respect to the magnetic disc for facilitating magnetic recording and reproducing thereon. The head supporting assembly comprises an actuator arm, a plurality of suspension arms, each having the magnetic head at one end thereof and connected to the actuator arm at the other end thereof, and a plurality of screws disposed through holes formed in the actuator arm and suspension arms for detachably connecting the suspension arms to the actuator arm. The screws are disposed in a staggered relationship with respect to each other in terms of the direction of access thereto and accessible for fastening and unfastening from two opposite sides in the direction substantially perpendicular to the disc surface. Each suspension arm can be attached to and detached from the actuator arm without the need of disassembly of the rest of the head supporting assembly.

5 Claims, 3 Drawing Sheets

4,835,641

MAGNETIC DISK APPARATUS

BACKGROUND OF THE INVENTION

This invention generally relates to a magnetic disc apparatus which is used in an external storage unit of an electronic computer system, and more particularly, to a magnetic head supporting assembly for use in a magnetic disc apparatus.

FIGS. 1 and 2 illustrate schematically an example of a conventional magnetic disc apparatus which includes a magnetic disc drive assembly 10 disposed on a base (not shown) and a magnetic head supporting assembly 20 disposed on the base for supporting magnetic heads 8 at predetermined relationships with respect to the magnetic disc 2 for facilitating magnetic recording and reproducing thereon.

The magnetic disc drive assembly 10 comprises a spindle motor 1a, a spindle 1 connected to the spindle motor 1a and a plurality of magnetic discs 2 supported by the spindle 1 for rotation in the direction of an arrow A. The magnetic head supporting assembly 20 comprises a plurality of actuator arms 3, a plurality of suspension arms 4 each having a magnetic head 8 mounted at one end thereof and connected to the actuator arm 3 at the other end thereof, and a plurality of screws 5 for connecting the actuator arm 3 to the suspension arm 4 respectively. The head supporting assembly 20 further comprises a plurality of spacers 6 disposed between the actuator arms 3 for vertically spacing the actuator arms 3 at a predetermined interval between each other and a plurality of mounting screws 7 for rigidly joining the spacers 6 to the actuator arms 3.

Each actuator arm 3 is connected to an actuator arm drive unit (not shown) for reciprocating the actuator arm 3 toward the axis of the disc 2 or toward the outer periphery thereof in parallel with respect to the surface of the disc 2 whereby the magnetic head can write (record) and read (reproduce) data at any desired position on the disc surface. The number of magnetic discs 2 and magnetic heads 8 are determined in accordance with the amount of data to be stored.

The thus constructed conventional magnetic head supporting assembly 20 has inconveniences in that, since the mounting positions of the suspension arms 4 are superposed one upon another in the axial direction of the spindle 1, the screws 5 must be introduced from the upper side of the assembly 20 to fixedly mount the suspension arms 4 on the actuator arm 3. Accordingly, it is difficult for assembly men to gain access to the mounting position of each of the suspension arms, i.e. the screws 5, when attaching or detaching the suspension arms one by one after their assembly. In order to replace any suspension arm 3, the actuator arm 3 must first be detached from the spacers 6, and then after attaching a new one to the actuator arm 3, this actuator arm is again attached to the spacers 6. Thus, assembly is both time consuming and troublesome.

SUMMARY OF THE INVENTION

Accordingly, an object of this invention is to provide a magnetic disc apparatus free from the above discussed inconveniences.

Another object of this invention is to provide a magnetic disc apparatus including a magnetic head supporting assembly in which the suspension arms are easily attachable to or detachable from the actuator arm.

According to this invention, a magnetic disc apparatus includes a disc drive assembly for driving a magnetic disc, a plurality of magnetic recording heads and a head supporting assembly for supporting the magnetic heads at predetermined relationships with respect to the magnetic disc for magnetic recording and reproducing thereon. The head supporting assembly comprises an actuator arm, a plurality of suspension arms, each having a magnetic head mounted at one end thereof and connected to the actuator arm at the other end thereof, a plurality of fastening means such as screws disposed on the actuator arm for detachably connecting the other end of the suspension arms to the actuator arm. The screws are accessible for fastening and unfastening in the direction substantially perpendicular with respect to the disc and disposed in a staggered relationship with respect to each other in terms of the direction of access to the screws.

According to this invention, the mounting screws are disposed in a staggered relationship to each other in terms of the direction of access thereto, whereby the suspension arms can be attached to or detached from the actuator arm without the need of disassembling of the rest of the head supporting assembly, resulting in an improvement in workability.

BRIEF DESCRIPTION OF THE DRAWINGS

This invention will become more readily apparent from the following detailed description of the preferred embodiments of this invention taken in conjunction with the accompanying drawings, in which.

DETAILED DESCRIPTION OF THE PREFERRED EMBODIMENTS

Figure 1:
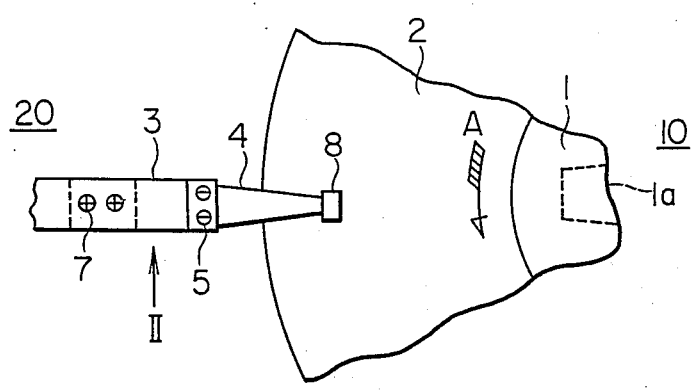
FIG. 1 is a plan view of a magnetic disc apparatus showing a conventional arrangement of a magnetic disc assembly and a magnetic head supporting assembly.
Figure 2:
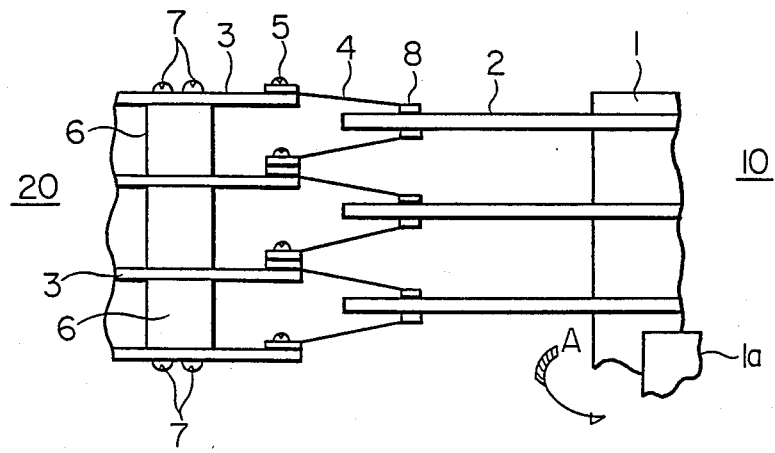
FIG. 2 is a side view of the apparatus as viewed in the direction of an arrow II in FIG. 1.

The magnetic disc apparatus according to this invention is substantially the same as the conventional one illustrated in FIGS. 1 and 2 except for the configuration of the head supporting assembly.

According to an embodiment of this invention, the magnetic disc apparatus includes a disc drive assembly 10 for driving a plurality of magnetic discs 2 which are vertically spaced with respect to each other and a head supporting assembly 30 disposed in a predetermined positional relationship with respect to the disc drive assembly 10.

Figure 3:
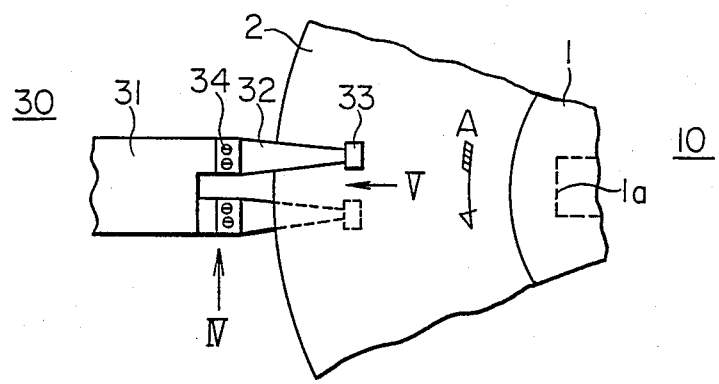
FIG. 3 is a plan view of a magnetic disc apparatus showing an arrangement of a disc drive assembly and a head supporting assembly according to an embodiment of this invention.
Figure 4:
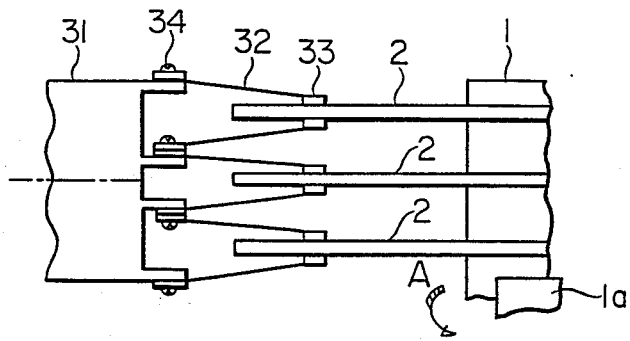
FIG. 4 is a side view of the apparatus as viewed in the direction of an arrow IV in FIG. 3.
Figure 5:
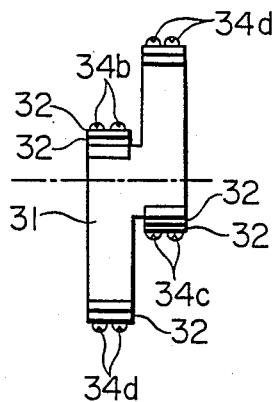
FIG. 5 is a front view of a portion of a head supporting assembly as viewed in the direction of an arrow V in FIG. 3.

The head supporting assembly 30 comprises an actuator arm 31 which is made of one body, a plurality of suspension arms 32, each having a magnetic head 33 mounted at one end thereof and connected to the actuator arm 31 at the other end thereof, a plurality of fastening means such as screws 34 screwed into threaded holes (not shown) formed at the other ends of the suspension arms 32 and said actuator arm 31, the holes in the arms 32 and 31 being disposed in a staggered relationship (i.e., offset when viewed from above) with respect to each other, so that the suspension arm 32 can be easily fastened to the actuator arm 31 by the screws 34. Each screw 34 is introduced into the respective holes formed in the suspension arms 32 and actuator arm 31 in a vectorial direction substantially perpendicular to the surface of the disc 2 as shown in FIG. 3. Accordingly, the screws 34 are disposed in a staggered relationship with respect to each other in terms of the direction of access thereto. As shown in FIG. 3, the mounting positions of the suspension arms 32 on the actuator arm 31 are in a staggered relationship with respect to a line in the plane of the disc and tangent to the disc 2. As shown in FIG. 5, the screws 34a and 34b are disposed in a staggered relationship with respect to each other in terms of the direction of access thereto from an upper side of the assembly 30 and the screws 34c and 34d are also disposed in a staggered relationship with respect to each other in terms of the direction of access thereto from a lower side of the assembly 30, thereby providing excellent accessibility to the respective screws 34a, 34b, 34c and 34d for assembly of the suspension arms 32a, 32b, 32c and 32d. In this case, the actuator arm 31 may be made of one body contrary to the conventional actuator arms 3 in FIG. 1.

Figure 6:
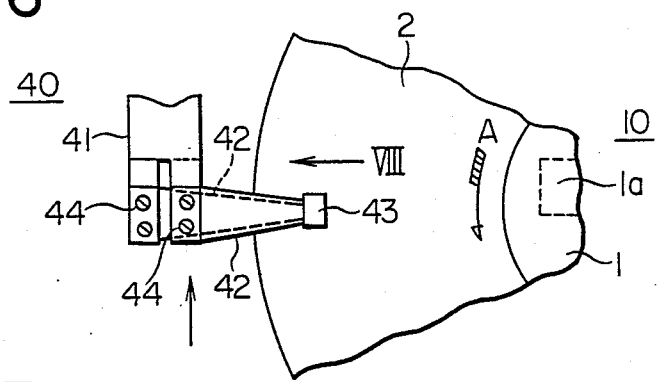
FIG. 6 is a plan view of a magnetic disc apparatus showing an arrangement of a disc drive assembly and a head supporting assembly according to another embodiment of this invention.
Figure 7:
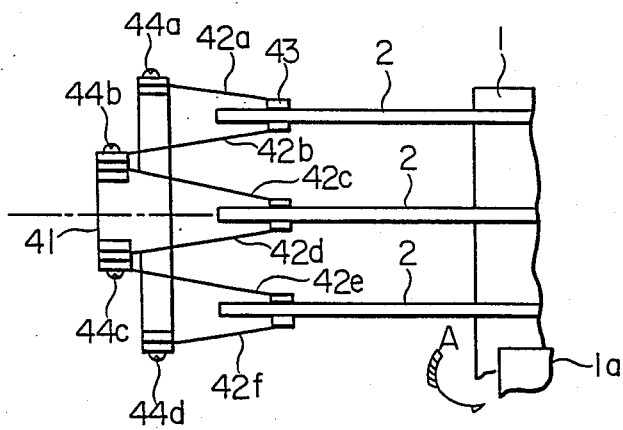
FIG. 7 is a side view of the apparatus as viewed in the direction of an arrow VII in FIG. 6.
Figure 8:
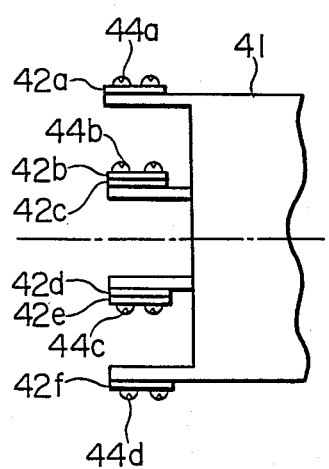
FIG. 8 is a side view of a portion of the head supporting assembly as viewed in the direction of an arrow VIII in FIG. 6.

According to another embodiment of this invention, an actuator arm 40 is substantially the same as the actuator arm 30 except for its configuration as can be seen from FIGS. 6, 7 and 8. FIG. 6 illustrates the actuator arm 41 which is swingable about a pivot (not shown) for positioning the heads 43 to a desired position on the discs 2. The mounting positions, i.e. the threaded holes or the screws 44 for detachably connecting the suspension arms 42 to the actuator arm 41, are disposed in a staggered relationship with respect to radial distance from the center of the disc 2. Accordingly, the suspension arms 42b, 42c, 42d and 42e must be longer than the suspension arms 42a and 42f as shown in FIG. 7. As can be seen from FIG. 7, the screws 44a and 44b are disposed in a staggered relationship with respect to each other in the direction of access thereto from an upper side of the assembly 40 and the screws 44c and 44d are also disposed in a staggered relationship with respect to each other in the direction of access thereto from a lower side of the assembly 40, thereby resolving the incoveniences of the conventional apparatus. In this case, the actuator arm 41 may be also made of one body contrary to the conventional actuator arms 3 illustrated in FIG. 2.

It should be noted that while the actuator arms 31 and 41 are made of one body in the illustrated embodiments, they may be divided into a plurality of arms as in the conventional assembly 20. The head supporting assembly according to this invention can use a rotary actuator or a linear actuator as an actuator arm drive unit.

As can be seen from the above description, the magnetic disc apparatus according to this invention includes the head supporting assembly comprising an actuator arm and a plurality of suspension arms, each having a magnetic head mounted at one end thereof and connected to the actuator arm through the screws. These screws are disposed in a staggered relationship with respect to each other in terms of the direction of access to the screws, whereby the suspension arms can be attached to or dettached from the actuator arm independently from each other without the need of disassemby of the rest of the head supporting apparatus, resulting in a significant improvement in the assembling operation and in a magnetic disc apparatus with a high reliability.

What is claimed is:

1. A magnetic disc apparatus including a disc drive assembly which drives a magnetic disc with upper and lower faces bearing a magnetic data storage medium, a plurality of magnetic recording heads, and a head supporting assembly supporting the magnetic heads at predetermined relationships with respect to the magnetic disc for magnetic recording and reproducing thereon, the head supporting assembly comprising:

an actuator arm;
a plurality of suspension arms, each having a magnetic head mounted on a first end thereof and connected to said actuator arm at a second end thereof, one of the suspension arms carrying a magnetic head on the upper face of the magnetic disc and another of the suspension arms carrying a magnetic head on the lower face of them magnetic disc;
respective fastening means disposed on said actuator arm for detachably connecting the second ends of said one and said other suspension arms to said actuator arm, said fastening means being accessible for fastening and unfastening in a single vectorial direction substantially perpendicular to the plane of the disc, and said fastening means being disposed in a staggered relationship with respect to each other in terms of the direction of access to said fastening means whereby both said one and said other suspension arms may be attached or detached from the actuator arm using the same direction of access without first disassembling the apparatus.

2. A magnetic disc apparatus as claimed in claim 1 wherein said fastening means are disposed in a staggered relationship with respect to a line in the plane of the disc and tangent to the disc.

3. A magnetic disc apparatus as claimed in claim 1 wherein said fastening means are disposed in a staggered relationship with respect to radial distance from the center of the disc.

4. A magnetic disc apparatus including a disc drive assembly which drives a plurality of coaxially arranged parallel magnetic discs with upper and lower faces bearing a magnetic data storage medium, a plurality of magnetic recording heads, and a head supporting assembly supporting the magnetic heads at predetermined relationships with respect to the upper and lower faces of the magnetic discs for magnetic recording and reproducing thereon, the head supporting assembly comprising:

an actuator arm;
a first plurality and a second plurality of suspension arms, each suspension arm having a magnetic head mounted on a first end thereof and connected to said actuator arm at a second end thereof, the suspension arms carrying a magnetic head on each face of each of the magnetic discs;
a first plurality and a second plurality of fastening means disposed on said actuator arm for detachably connecting the second ends of said first and second pluralities of suspension arms, respectively, to said actuator arm, said first plurality of fastening means being accessible for fastening and unfastening in a first vectorial direction substantially perpendicular to the plane of the disc, said second plurality of fastening means being accessible for fastening and unfastening in a second vectorial direction approximately 180 degrees from the first direction, each of said first plurality of fastening means being disposed in a consecutively offset relationship with respect to each other in terms of the first direction of access to said first plurality of fastening means, and each of said second plurality of fastening means being disposed in a consecutively offset relationship with respect to each other in terms of the second direction of access to said second plurality of fastening means.

5. A magnetic disc apparatus including a disc drive assembly which drives a plurality of coaxially arranged parallel magnetic discs with upper and lower faces bearing a magnetic data storage medium, a plurality of magnetic recording heads, and a head supporting assembly supporting the magnetic heads at predetermined relationships with respect to the upper and lower faces of the magnetic discs for magnetic recording and reproducing thereon, the head supporting assembly comprising:

an actuator arm;

a plurality of suspension arms, each having a magnetic head mounted on a first end thereof and connected to said actuator arm at a second end thereof;

a plurality of fastening means disposed on said actuator arm for detachably connecting the second ends of said suspension arms to said actuator arm, said fastening means being accessible for fastening and unfastening in a single vectorial direction substantially perpendicular to the planes of the discs, and said fastening means being disposed in a consecutively offset relationship with respect to each other in terms of the direction of access to said fastening means.

* * * * *